United States Patent
Ke et al.

(10) Patent No.: US 11,032,839 B2
(45) Date of Patent: Jun. 8, 2021

(54) UPLINK SIGNAL TRANSMISSION METHOD, APPARATUS, SYSTEM, COMMUNICATIONS DEVICE, AND STORAGE MEDIUM

(71) Applicants: China Mobile Communication Co., Ltd Research Institute, Beijing (CN); China Mobile Communications Group Co., Ltd., Beijing (CN)

(72) Inventors: Ting Ke, Beijing (CN); Xueying Hou, Beijing (CN); Hui Ma, Beijing (CN); Jianjun Liu, Beijing (CN)

(73) Assignees: China Mobile Communication Co., Ltd Research Institute, Beijing (CN); China Mobile Communications Group Co., Ltd., Beijing (CN)

( * ) Notice: Subject to any disclaimer, the term of this patent is extended or adjusted under 35 U.S.C. 154(b) by 0 days.

(21) Appl. No.: 16/324,332

(22) PCT Filed: Sep. 26, 2017

(86) PCT No.: PCT/CN2017/103540
§ 371 (c)(1),
(2) Date: Feb. 8, 2019

(87) PCT Pub. No.: WO2018/059412
PCT Pub. Date: Apr. 5, 2018

(65) Prior Publication Data
US 2019/0208537 A1    Jul. 4, 2019

(30) Foreign Application Priority Data
Sep. 27, 2016  (CN) .......................... 201610857387.1

(51) Int. Cl.
*H04W 72/12* (2009.01)
*H04W 74/08* (2009.01)
(Continued)

(52) U.S. Cl.
CPC ....... *H04W 72/1284* (2013.01); *H04L 1/0003* (2013.01); *H04L 1/004* (2013.01);
(Continued)

(58) Field of Classification Search
CPC ..... H04L 1/0003; H04L 1/0038; H04L 1/004; H04L 5/0007; H04W 48/08;
(Continued)

(56) References Cited

U.S. PATENT DOCUMENTS

2010/0311430 A1* 12/2010 Katayama ............. H04L 1/0027
455/450
2013/0028151 A1   1/2013 Ning et al.
(Continued)

FOREIGN PATENT DOCUMENTS

| CN | 101771463 A | 7/2010 |
|---|---|---|
| CN | 101964677 A | 2/2011 |

(Continued)

OTHER PUBLICATIONS

International Search Report issued in PCT/CN2017/103540, dated Jan. 3, 2018.
(Continued)

*Primary Examiner* — Benjamin H Elliott, IV
(74) *Attorney, Agent, or Firm* — BakerHostetler

(57) ABSTRACT

The present disclosure discloses an uplink (UL) signal transmission method, apparatus and system, for effectively reducing channel resource overhead while protecting UL channel access opportunities. An uplink signal transmission method implemented on a UE side comprises: a UE determining, from at least one predefined candidate transmission position according to a preset rule, a transmission start position for transmitting an uplink signal; and beginning transmitting of the uplink signal at the determined transmission start position. In an uplink signal transmission method (Continued)

Detection of a total power level and/or a predetermined characteristic signal level on the present channel is initiated at a predetermined advance prior to a starting OFDM symbol of the candidate transmission position — S41

If the total power level is not higher than a first predetermined threshold and/or the predetermined characteristic signal level is not higher than a second predetermined threshold within a predefined duration, it is determined that the channel is idle at the candidate transmission position; and if the total power level is higher than the first predetermined threshold and the predetermined characteristic signal level is higher than the second predetermined threshold within the predefined duration, it is determined that the channel is busy at the candidate transmission position — S42 implemented on a base station side, an uplink scheduling grant (UL grant) is sent to schedule a UE to perform uplink transmission, and an uplink subframe sent by the UE is received; and a transmission start position of the uplink signal is determined in the uplink subframe.

16 Claims, 18 Drawing Sheets

(51) Int. Cl.
| | |
|---|---|
| *H04W 72/14* | (2009.01) |
| *H04L 1/00* | (2006.01) |
| *H04W 48/08* | (2009.01) |
| *H04W 74/04* | (2009.01) |
| *H04L 5/00* | (2006.01) |
| *H04W 76/27* | (2018.01) |

(52) U.S. Cl.
CPC ........... *H04L 1/0038* (2013.01); *H04W 48/08* (2013.01); *H04W 72/1268* (2013.01); *H04W 72/14* (2013.01); *H04W 74/04* (2013.01); *H04W 74/0816* (2013.01); *H04L 5/0007* (2013.01); *H04W 76/27* (2018.02)

(58) Field of Classification Search
CPC ......... H04W 72/1268; H04W 72/1284; H04W 72/14; H04W 74/04; H04W 74/0816; H04W 76/27
See application file for complete search history.

(56) References Cited

U.S. PATENT DOCUMENTS

| | | | | | |
|---|---|---|---|---|---|
| 2016/0301555 | A1* | 10/2016 | Nory | .................... | H04W 72/044 |
| 2018/0007708 | A1* | 1/2018 | Ke | .................... | H04W 72/1205 |
| 2018/0069653 | A1* | 3/2018 | Fujishiro | ............... | H04L 1/0004 |
| 2018/0262282 | A1* | 9/2018 | Yang | .................... | H04L 5/0082 |
| 2019/0029046 | A1* | 1/2019 | Li | .................... | H04W 74/0816 |
| 2019/0208537 | A1* | 7/2019 | Ke | ........................ | H04L 1/0016 |

FOREIGN PATENT DOCUMENTS

| | | |
|---|---|---|
| CN | 102170647 A | 8/2011 |
| CN | 102595599 A | 7/2012 |
| CN | 102638333 A | 8/2012 |
| CN | 103731927 A | 4/2014 |
| CN | 105306180 A | 2/2016 |
| CN | 105338640 A | 2/2016 |
| CN | 105611641 A | 5/2016 |
| WO | 2009/034221 A1 | 3/2009 |

OTHER PUBLICATIONS

English translation of Written Opinion issued in PCT/CN2017/103540, dated Jan. 3, 2018.

* cited by examiner

UPLINK SIGNAL TRANSMISSION METHOD, APPARATUS, SYSTEM, COMMUNICATIONS DEVICE, AND STORAGE MEDIUM

CROSS-REFERENCE TO RELATED APPLICATION

The present application is a National Stage of International Patent Application No. PCT/CN2017/103540, filed on Sep. 26, 2017, and claims priority to Chinese Patent Application No. 201610857387.1, filed on Sep. 27, 2016, the contents of which are incorporated herein by reference in their entirety.

TECHNICAL FIELD

The disclosure relates to the field of wireless communications, and particularly to a method, device and system for transmitting an uplink (UL) signal, a communication device and a storage medium.

BACKGROUND

Along with explosion of data traffic in the mobile Internet, a Long Term Evolution (LTE)-unlicensed technology becomes a development trend.

An unlicensed frequency band is open to all Radio Access Technologies (RATs) and all operating companies and different operating companies have the same right to deploy respective RAT systems (for example, Wireless Fidelity (WIFI) and LTE-unlicensed) on the unlicensed band. Since interference coordination planning is not performed (for example, site planning is not performed) between sites deployed by different RAT operating companies (for example, WIFI and LTE-unlicensed), these sites are not allowed to simultaneously transmit services, otherwise a relatively strong mutual interference may be brought.

For ensuring fair, ordered and collision-free (namely simultaneous service transmission is forbidden) contention of different RAT systems or different operating companies of the same RAT system for an unlicensed band, a Listen Before Talk (LBT) mechanism is introduced. That is, every time before data transmission, a period of time may be reserved to sense a carrier for a Clear Channel Assessment (CCA) process, data transmission may be initiated only when the carrier is sensed to be available and there is a limit to a maximum duration of each data transmission.

UL transmission of User Equipment (UE) on an unlicensed spectrum is also required to follow the LBT mechanism. As illustrated in FIG. 1, since a moment when the UE detects that a channel is idle (i.e., an LBT success moment) may be any time point in a radio subframe defined in LTE, there exists a certain gap (guard period) between the LBT success moment and a boundary of a next complete UL subframe. Since the moment when detected that the channel is idle is not fixed (it may be any time point in the radio subframe), a time length of the gap is also not fixed.

Therefore, a conventional LTE system works on a licensed spectrum exclusive to a telecommunication operating company, and for reducing a resource scheduling overhead, UE of the conventional LTE system may perform UL data transmission in a complete subframe only. In this case, the UE may select multiple behavior manners in a gap.

A first manner: the UE does not send any signal in the gap and, instead, continues implementation of LBT. Only when the UE may determine that a channel is idle in the whole gap, the UE may perform UL transmission in a next complete UL subframe. In the first manner, another system device (for example, WIFI) may monitor that the channel is idle in the gap and further initiate transmission in the gap. In such case, the UE may lose this transmission opportunity.

A second manner: the UE does not send any signal in the gap and continues implementation of LBT in first N us (e.g., N=25) of the next complete UL subframe. Only when the UE may determine that the channel is idle in the N us, the UE may perform UL transmission in the next complete UL subframe. In the second manner, the other system device (for example, WIFI) may monitor that the channel is idle in the gap and further initiate transmission in the gap. In such case, the UE may lose this transmission opportunity.

A third manner: the UE sends an occupancy signal in the gap and performs UL transmission in the next complete UL subframe. In the third manner, although the UE send the occupancy signal to protect this UL access opportunity, the occupancy signal may not be configured for data transmission and thus the occupancy signal is completely a channel resource overhead.

It is apparent that the first manner to the third manner have their own defects. In the first manner and the second manner, the UL channel access opportunity may not be effectively protected, so that it is unfair to the UE. In the third manner, a relatively high channel resource overhead may be brought.

SUMMARY

The disclosure provides a method, device and system for transmitting an uplink signal, a communication device and a storage medium, which are capable of protecting a UL channel access opportunity and meanwhile effectively reducing a channel resource overhead.

The disclosure provides a method for transmitting a UL signal implemented on a UE side, which may include the following operations.

UE determines a starting transmission position for transmission of the UL signal from at least one predefined candidate transmission position according to a predefined rule.

Transmission of the UL signal is initiated at the determined starting transmission position.

Preferably, the at least one predefined candidate transmission position may be predetermined by a network-side device and the UE; or the at least one candidate transmission position may be preconfigured by the network-side device and indicate to the UE through system information or Radio Resource Control (RRC) signaling.

Preferably, the candidate transmission position may start from a starting boundary of a kth Orthogonal Frequency Division Multiplexing (OFDM) symbol of a UL subframe; or the candidate transmission position may start from a specified time offset of the kth OFDM symbol of the UL subframe.

Preferably, the operation that the UE determines the starting transmission position for transmission of the UL signal in the at least one predefined candidate transmission position according to the predefined rule may specifically include the following operation.

The UE determines the starting transmission position for transmission of the UL signal in the at least one predefined candidate transmission position according to a Listen Before Talk (LBT) result.

Preferably, the operation that the UE determines the starting transmission position for transmission of the UL signal from the at least one predefined candidate transmission position according to the LBT result may specifically include the following actions.

For each UL subframe, the UE sequentially senses whether a channel is idle at each candidate transmission position in the UL subframe from a first candidate transmission position of the UL subframe until sensing a candidate transmission position where the channel is idle.

The candidate transmission position where the channel is idle is determined as the starting transmission position for transmission of the UL signal.

Optionally, the method for transmitting a UL signal provided in the disclosure may further include the following operation.

When it is detected that the channel is busy at all the candidate transmission positions in the UL subframe, transmission of the UL signal in the UL subframe is stopped.

Preferably, for each candidate transmission position, the determination regarding whether the channel is idle at the candidate transmission position may be made according to the following method.

Detection of a total power level and/or a predetermined characteristic signal level on the present channel is initiated at a predetermined advance prior to a starting OFDM symbol of the candidate transmission position.

When the total power level is not greater than a first predetermined threshold and/or the predetermined characteristic signal level is not greater than a second predetermined threshold in a predefined duration, it is determined that the channel is idle at the candidate transmission position.

When the total power level is greater than the first predetermined threshold and the predetermined characteristic signal level is greater than the second predetermined threshold in the predefined duration, it is determined that the channel is busy at the candidate transmission position.

Optionally, the method for transmitting a UL signal provided in the disclosure may further include the following operations.

The UE receives a UL grant message sent by the network side, the UL grant message carrying a UL Modulation and Coding Scheme (MCS) level corresponding to each candidate transmission position.

The UE determines a UL Transport Block Size (TBS) according to the determined starting transmission position, the corresponding UL MCS level and the number of scheduled UL Physical Resource Blocks (PRBs).

Optionally, the method for transmitting a UL signal provided in the disclosure may further include the following operations.

The UE receives the UL grant message sent by the network side, the UL grant message carrying a default UL MCS level and the default UL MCS being a UL MCS level used during transmission of the UL signal with a complete UL subframe.

The UE determines the UL TBS corresponding to the starting transmission position according to the default UL MCS level and a predefined rule.

Preferably, a first mapping relationship lookup table may be predefined, the first mapping relationship lookup table may include a correspondence between a UL TBS and each of a default UL MCS level, the number of scheduled UL PRBs and the number of OFDM symbols practically used for transmitting a UL signal, and the OFDM symbols practically used for transmitting the UL signal may be OFDM symbols except those for transmitting a UL Demodulation Reference Signal (DMRS).

Preferably, the operation that the UE determines the UL TBS corresponding to the starting transmission position according to the default UL MCS level and the predefined rule may specifically include the following actions.

The UE determines the number of OFDM symbols practically used for transmitting the UL signal according to the determined starting transmission position.

The first mapping relationship lookup table is searched for the UL TBS according to the determined number of the OFDM symbols practically used for transmitting the UL signal, the number of the scheduled UL PRBs and the default UL MCS level.

The found UL TBS is determined as the UL TBS corresponding to the starting transmission position.

Preferably, a second mapping relationship lookup table may be predefined and the second mapping relationship lookup table may include a correspondence between a UL TBS and each of a default UL MCS level and the number of scheduled UL PRBs.

The operation that the UE determines the UL TBS corresponding to the starting transmission position according to the default UL MCS level and the predefined rule may specifically include the following actions.

The UE searches the second mapping relationship lookup table for the UL TBS according to the default UL MCS level and the number of the scheduled UL PRBs.

The UL TBS corresponding to the starting transmission position is determined according to the following formula:

$$h\left(\frac{TBS_1}{N} * n\right),$$

where h( ) may be a rounding function, or h( ) may be a rounding-up function, or h( ) may be a rounding-down function;

$TBS_1$ may be the found UL TBS in the second mapping relationship lookup table according to the default UL MCS level and the number of the scheduled UL PRBs;

n may be the number, determined according to the starting transmission position, of the OFDM symbols practically used for transmitting the UL signal; and N may be the number of the OFDM symbols except those for transmitting the UL DMRS during UL transmission with the complete subframe.

Optionally, the method for transmitting a UL signal implemented on the UE side may further include the following operations.

A transmission position of a UL DMRS is determined according to the determined starting transmission position and the predefined rule.

The UL DMRS is transmitted at the determined transmission position of the UL DMRS.

Preferably, the operation that the transmission position of the UL DMRS is determined according to the determined starting transmission position and the predefined rule may specifically include the following action.

The transmission position of the UL DMRS is determined according to the determined starting transmission position and a predefined correspondence between a candidate transmission position and a UL DMRS transmission position.

The disclosure provides a method for transmitting a UL signal implemented on a base station (Evolved Node B, eNB) side, which may include the following operations.

A UL grant message is sent to schedule UE for UL transmission.

A UL subframe sent by the UE is received.

A starting transmission position for a UL signal is determined in the UL subframe.

Preferably, a UL grant message may contain a UL MCS level corresponding to each candidate transmission position.

Preferably, the operation that the starting transmission position for the UL signal is determined in the UL subframe may specifically include the following actions.

Data demodulation is attempted to be performed at each candidate transmission position configured for the UE in the UL subframe.

The candidate transmission position where a Cyclic Redundancy Check (CRC) check succeeds after demodulation is determined as the starting transmission position for UL signal transmission of the UE.

Preferably, the operation that the starting transmission position for the UL signal is determined in the UL subframe may specifically include the following actions.

A transmission position of a UL DMRS is determined by blind detection.

The starting transmission position for UL signal transmission of the UE is determined according to the transmission position of the UL DMRS.

Preferably, the operation that the starting transmission position for UL signal transmission of the UE is determined according to the transmission position of the UL DMRS may specifically include the following actions.

When a UL DMRS is located in a first slot of the UL subframe, it is determined that the starting transmission position for UL signal transmission of the UE is in the first slot of the UL subframe.

When the UL DMRS is located in a second slot of the UL subframe, it is determined that the starting transmission position for UL signal transmission of the UE is in the second slot of the UL subframe.

When the UL DMRS does not exist in both of the first slot and the second slot, it is determined that the UL signal is not transmitted in the UL subframe.

Preferably, when there are multiple candidate transmission positions configured for the UE in each slot, the method may further include the following operations.

Data demodulation is attempted to be performed at each candidate transmission position configured for the UE in a slot where the UL DMRS is transmitted.

The candidate transmission position where the CRC check succeeds after demodulation is determined as the starting transmission position for UL signal transmission of the UE.

Preferably, a correspondence between a candidate transmission position and a UL DMRS transmission position may be predefined.

The operation that the starting transmission position for the UL signal is determined in the UL subframe may specifically include the following actions.

A transmission position of a UL DMRS is determined by blind detection.

The predefined correspondence between the candidate transmission position and the UL DMRS transmission position is searched for a candidate transmission position corresponding to the determined transmission position of the UL DMRS.

The found candidate transmission position is determined as the starting transmission position for the UL signal.

The disclosure provides a device for transmitting a UL signal implemented on a UE side, which may include a first determination unit and a transmission unit.

The first determination unit may be configured to determine a starting transmission position for transmission of a UL signal from at least one predefined candidate transmission position according to a predefined rule.

The transmission unit may be configured to initiate transmission of the UL signal at the determined starting transmission position.

Preferably, the at least one predefined candidate transmission position may be predetermined by a network-side device and UE; or the at least one candidate transmission position may be preconfigured by the network-side device and indicate to the UE through system information or RRC signaling.

Preferably, the candidate transmission position may start from a starting boundary of a kth Orthogonal Frequency Division Multiplexing (OFDM) symbol of a UL subframe; or the candidate transmission position may start from a specified time offset of the kth OFDM symbol of the UL subframe.

Preferably, the first determination unit may specifically be configured to determine the starting transmission position for transmission of the UL signal from the at least one predefined candidate transmission position according to an LBT result.

Preferably, the first determination unit may include a sensing subunit and a first determination subunit.

The sensing subunit may be configured to, for each UL subframe, sequentially sense through the UE whether a channel is idle at each candidate transmission position in the UL subframe from a first candidate transmission position of the UL subframe till sensing a candidate transmission position where the channel is idle.

The first determination subunit may be configured to determine the candidate transmission position where the channel is idle as the starting transmission position for transmission of the UL signal.

Preferably, the sensing subunit may include a sensing module and a first determination module.

The sensing module may be configured to initiate detection of a total power level and/or a predetermined characteristic signal level on the present channel at a predetermined advance prior to a starting OFDM symbol of the candidate transmission position.

The first determination module may be configured to, when the total power level is not greater than a first predetermined threshold and/or the predetermined characteristic signal level is not greater than a second predetermined threshold in a predefined duration, determine that the channel is idle at the candidate transmission position, and when the total power level is greater than the first predetermined threshold and the predetermined characteristic signal level is greater than the second predetermined threshold in the predefined duration, determine that the channel is busy at the candidate transmission position.

Optionally, the device for transmitting a UL signal implemented on the UE side may further include a first receiving unit and a second determination unit.

The first receiving unit may be configured to receive a UL grant message sent by the network-side device, the UL grant message carrying a UL MCS level corresponding to each candidate transmission position.

The second determination unit may be configured to determine a UL TBS according to the determined starting transmission position, the corresponding UL MCS level and the number of scheduled UL PRBs.

Optionally, the device for transmitting a UL signal implemented on the UE side may further include a second receiving unit and a third determination unit.

The second receiving unit may be configured to receive the UL grant message sent by the network side, the UL grant message carrying a default UL MCS level and the default UL MCS being a UL MCS level used during transmission of the UL signal with a complete UL subframe.

The third determination unit may be configured to determine the UL TBS corresponding to the starting transmission position according to the default UL MCS level and a predefined rule.

Preferably, a first mapping relationship lookup table may be predefined, the first mapping relationship lookup table may include a correspondence between a UL TBS and each of a default UL MCS level, the number of scheduled UL PRBs and the number of OFDM symbols practically used for transmitting a UL signal, and the OFDM symbols practically used for transmitting the UL signal may be OFDM symbols except those for transmitting a UL DMRS.

Preferably, the third determination unit may include a second determination module, a first searching module and a third determination module.

The second determination module may be configured to determine the number of OFDM symbols practically used for transmitting the UL signal according to the determined starting transmission position.

The first searching module may be configured to search the first mapping relationship lookup table for the UL TBS according to the determined number of the OFDM symbols practically used for transmitting the UL signal, the number of the scheduled UL PRBs and the default UL MCS level.

The third determination module may be configured to determine the found UL TBS as the UL TBS corresponding to the starting transmission position.

Preferably, a second mapping relationship lookup table may be predefined and the second mapping relationship lookup table may include a correspondence between a UL TBS and each of a default UL MCS level and the number of scheduled UL PRBs.

The third determination unit may include a second searching module and a fourth determination module.

The second searching module may be configured to search the second mapping relationship lookup table for the UL TBS according to the default UL MCS level and the number of the scheduled UL PRBs.

The fourth determination module may be configured to determine the UL TBS corresponding to the starting transmission position according to the following formula:

$$h\left(\frac{TBS_1}{N} * n\right).$$

h( ) may be a rounding function, or h( ) may be a rounding-up function, or h( ) may be a rounding-down function; $TBS_1$ may be the found UL TBS in the second mapping relationship lookup table according to the default UL MCS level and the number of the scheduled UL PRBs; n may be the number, determined according to the starting transmission position, of the OFDM symbols practically used for transmitting the UL signal; and N may be the number of the OFDM symbols except those transmitting the UL DMRS during UL transmission with the complete subframe.

Optionally, the device for transmitting a UL signal implemented on the UE side may further include a fourth determination unit.

The fourth determination unit may be configured to determine a transmission position of a UL DMRS according to the determined starting transmission position and the predefined rule.

The transmission unit may be configured to transmit the UL DMRS at the determined transmission position of the UL DMRS.

Preferably, the fourth determination unit may specifically be configured to determine the transmission position of the UL DMRS according to the determined starting transmission position and on the basis of a predefined correspondence between a candidate transmission position and a UL DMRS transmission position.

The disclosure provides a device for transmitting a UL signal implemented on an eNB side, which may include a sending unit, a receiving unit and a determination unit.

The sending unit may be configured to send a UL grant message to schedule UE for UL transmission.

The receiving unit may be configured to receive a UL subframe sent by the UE.

The determination unit may be configured to determine a starting transmission position for a UL signal in the UL subframe.

A UL grant message may contain a UL MCS level corresponding to each candidate transmission position.

Preferably, the determination unit may include a first data demodulation subunit and a first determination subunit.

The first data demodulation subunit may be configured to attempt to perform data demodulation at each candidate transmission position configured for the UE in the UL subframe.

The first determination subunit may be configured to determine the candidate transmission position where a CRC check succeeds after demodulation as the starting transmission position for UL signal transmission of the UE.

Preferably, the determination unit may specifically include a second determination subunit and a third determination subunit.

The second determination subunit may be configured to determine a transmission position of a UL DMRS by blind detection.

The third determination subunit may be configured to determine the starting transmission position for UL signal transmission of the UE according to the transmission position of the UL DMRS.

Preferably, the third determination subunit may specifically be configured to, determine that the starting transmission position for UL signal transmission of the UE is in the first slot of the UL subframe when the UL DMRS is located in a first slot of the UL subframe, determine that the starting transmission position for UL signal transmission of the UE is in the second slot of the UL subframe when the UL DMRS is located in a second slot of the UL subframe, and determine that the UL signal is not transmitted in the UL subframe when the UL DMRS does not exist in both of the first slot and the second slot.

Optionally, the determination unit may further include a second data demodulation subunit and a fourth determination subunit.

The second data demodulation subunit may be configured to attempt to perform data demodulation at each candidate transmission position configured for the UE in a slot where the UL DMRS is transmitted when there are multiple candidate transmission positions configured for the UE in each slot.

The fourth determination subunit may be configured to determine the candidate transmission position where the CRC check succeeds after demodulation as the starting transmission position for UL signal transmission of the UE.

Preferably, the determination unit may specifically include a predefinition subunit, a fifth determination subunit, a searching subunit and a sixth determination subunit.

The predefinition subunit may be configured to predefine a correspondence between a candidate transmission position and a UL DMRS transmission position.

The fifth determination subunit may be configured to determine a transmission position of a UL DMRS by blind detection.

The searching subunit may be configured to search the predefined correspondence between the candidate transmission position and the UL DMRS transmission position for a candidate transmission position corresponding to the determined transmission position of the UL DMRS.

The sixth determination subunit may be configured to determine the candidate transmission position found by the searching subunit as the starting transmission position for the UL signal.

The disclosure provides a system for transmitting a UL signal, which may include UE and a base station. The UE configures with the device for transmitting a UL signal on the UE side and the base station configures with the device for transmitting a UL signal on the base station side.

The disclosure provides a communication device, which may include a processor and a memory configured to store a computer program capable of running on the processor.

Herein, the processor may be configured to run the computer program to execute the operations of the above-mentioned method.

The disclosure provides a storage medium, which may store a computer-executable instruction, the computer-executable instruction being executed to implement the operations of the abovementioned method.

According to the method, device and system for transmitting a UL signal, communication device and storage medium provided in the disclosure, the network side configures the at least one candidate transmission position for the UE in the UL subframe, and then the UE may determine the starting transmission position for the UL from the at least one candidate transmission position and initiates transmission of the UL from the determined starting transmission position. Compared with a manner that the UE waits for a next complete UL subframe to start transmitting the UL signal, such a manner has the advantages that an access opportunity of the UE is ensured and a transmission resource is fully utilized. Moreover, the UE is not required to send an occupancy signal, so that a channel resource overhead is reduced. On the network side, a base station, after receiving the UL subframe sent by the UE, determines the starting position for UL signal transmission of the UE in the UL subframe and performs subsequent processing.

Other characteristics and advantages of the disclosure will be elaborated in the following specification, and moreover, partially become apparent from the specification or are understood by implementing the disclosure. The purpose and other advantages of the disclosure may be achieved and obtained through structures particularly pointed out in the specification, the claims and the drawings.

BRIEF DESCRIPTION OF DRAWINGS

The drawings described herein are adopted to provide a further understanding to the disclosure and form a part of the disclosure. Schematic embodiments of the disclosure and descriptions thereof are adopted to explain the disclosure and not intended to form improper limits to the disclosure. In the drawings.

DETAILED DESCRIPTION

Figure 1:
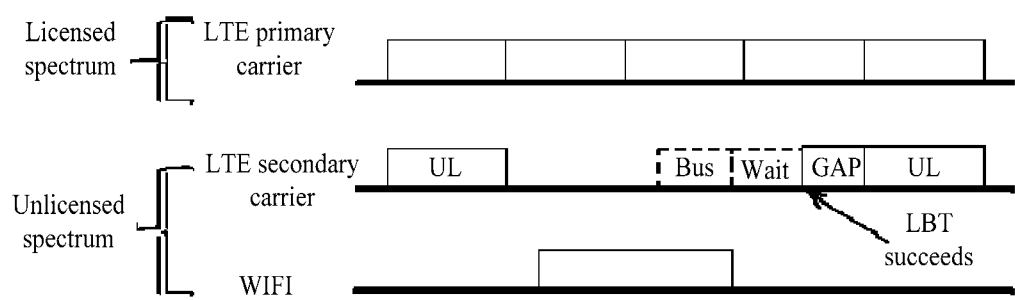
FIG. 1 is a schematic diagram of transmission on an unlicensed spectrum according to a related art.

In order to reduce a channel resource overhead at the same time of ensuring a transmission opportunity of UE in an unlicensed spectrum and increasing a utilization rate of a transmission resource, the disclosure provides a method, device and system for transmitting a UL signal.

Preferred embodiments of the disclosure will be described below in combination with the drawings in the specification. It is to be understood that the preferred embodiments described herein are adopted not to limit the disclosure but only to describe and explain the disclosure. Moreover, the embodiments in the disclosure and characteristics in the embodiments may be combined without conflicts.

The inventor finds that a conventional LTE system works on a licensed spectrum exclusive to a telecommunication operating company, and for reducing a resource scheduling overhead, UE of the conventional LTE system may perform UL data transmission in a complete subframe only. In some new application scenarios, UL transmission of UE working on an unlicensed spectrum is required to follow an LBT mechanism and there may exist a certain gap between an LBT success moment and a boundary of a next complete subframe. In some of existing UL signal transmission manners, a UL channel access opportunity may not be effectively ensured and it is unfair to the UE. In some others, a relatively high channel resource overhead may be brought.

In view of this, for the problem of inconsistency between an LBT success moment and a boundary of a UL subframe, the disclosure provides a method for performing UL transmission in a partial subframe. Through the method, a UL channel access opportunity may be protected and a channel resource overhead may also be effectively reduced.

It is to be noted that a method for transmitting a UL signal provided in the embodiments of the disclosure is not limited to application of an LTE technology to an unlicensed spectrum. It may also be applied to various other communication systems. For example, a 5th-Generation (5G) communication technology is applied to the unlicensed spectrum. Furthermore, in some new LTE or 5G application scenarios, for example, an ultra-dense network scenario or a flexible uplink and downlink transmission scenario, the method for transmitting a UL signal provided in the disclosure may also be applied to a licensed spectrum.

In the disclosure, for each UL subframe, a network-side device and UE predetermine at least one candidate transmission position, or the network-side device preconfigures the at least one candidate transmission position for the UE and notifies the UE through system information or RRC signaling. Herein, the candidate transmission position may include multiple timing relationships. For example, each candidate transmission position may start from a starting boundary of a kth OFDM symbol of a UL subframe. Alternatively, the candidate transmission position starts from a specified moment of the kth OFDM symbol of the UL subframe. For example, the candidate transmission position starts from a T1th us after the starting boundary of the kth OFDM symbol. T1 may be set according to a requirement. For example, T1 may be set to be 25 us. In the disclosure, if OFDM symbols in the subframe are counted from 0, k is an integer greater than or equal to 0.

Due to different processing capabilities of different UE, an eNB may configure different candidate transmission positions for different UE. For example, as for UE capable of supporting only one single starting transmission position, the eNB configures a candidate transmission position for the UE through RRC signaling to be {a starting boundary of a kith OFDM symbol}. While, as for UE capable of supporting multiple candidate starting transmission positions, the eNB configures the candidate transmission positions for the UE through the RRC signaling to be {the starting boundary of the k1th OFDM symbol, a starting boundary of a k2th OFDM symbol}. For example, k1=1 and k2=7.

Therefore, from the perspective of the eNB, two sets of candidate starting position transmission modes are configured: {the starting boundary of the k1th OFDM symbol} and {the starting boundary of the k1th OFDM symbol, the starting boundary of the k2th OFDM symbol}.

Figure 2:
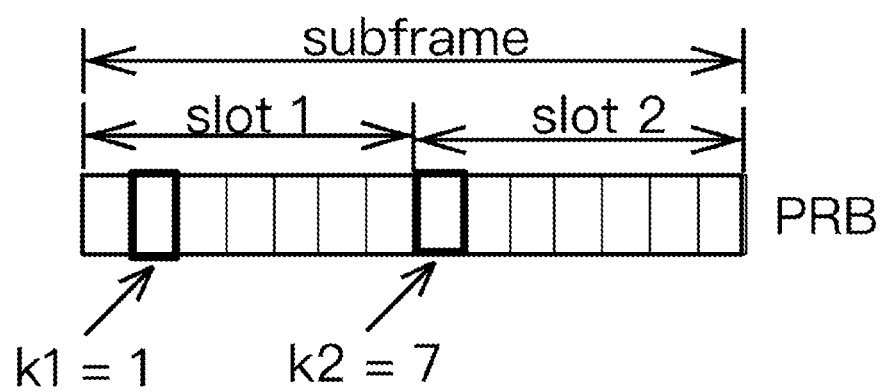
FIG. 2 is a schematic diagram of a UL subframe configured with two candidate transmission positions according to the disclosure.

As illustrated in FIG. 2, FIG. 2 illustrates a schematic diagram of a UL subframe configured with two candidate transmission positions, i.e., k1=1 and k2=7.

Figure 3:
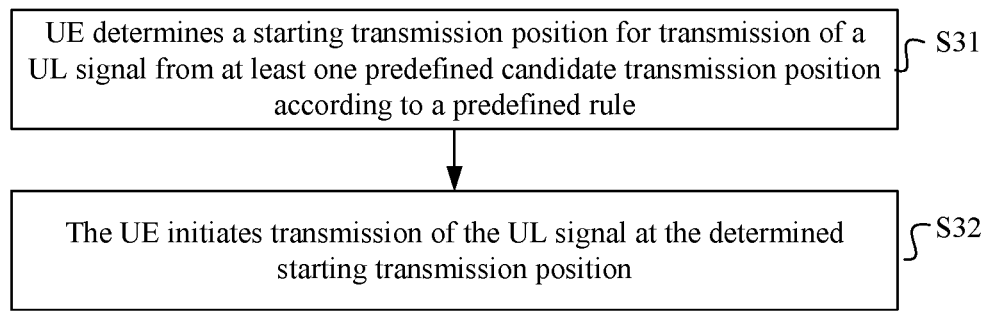
FIG. 3 is an implementation flowchart of a method for transmitting a UL signal implemented on a UE side according to the disclosure.

On such a basis, the disclosure provides a method for transmitting a UL signal implemented on a UE side. As illustrated in FIG. 3, the method may include the following operations.

In S31, UE determines a starting transmission position for transmission of a UL signal from at least one predefined candidate transmission position according to a predefined rule.

Preferably, the UE may determine the starting transmission position for transmission of the UL signal from the at least one predefined candidate transmission position according to an LBT result.

In S32, the UE initiates transmission of the UL signal at the determined starting transmission position.

Preferably, in S31, for each UL subframe, the UE sequentially senses whether a channel is idle at each candidate transmission position in the UL subframe from a first candidate transmission position of the UL subframe until sensing the candidate transmission position where the channel is idle, and determines the candidate transmission position where the channel is idle as the starting transmission position for transmission of the UL signal. If the UE monitors that the channel is busy at all the candidate transmission positions in the UL subframe, transmission of the UL signal in the UL subframe is stopped.

Specifically, the UE starts detecting, from the first candidate transmission position, whether the channel is idle at the candidate transmission position. If it is determined that the channel is idle at the present candidate transmission position, UL transmission is initiated from the present candidate transmission position. Otherwise, if it is determined that the channel is busy at the present candidate transmission position, the UE continues to detect whether the channel is idle at the next candidate transmission position. If it is detected that the channel is idle at any candidate transmission position of the UL subframe, UL transmission is initiated from the idle candidate transmission position. Otherwise, if it is detected that the channel is busy at all the candidate transmission positions, UL transmission of the subframe is stopped.

Figure 4:
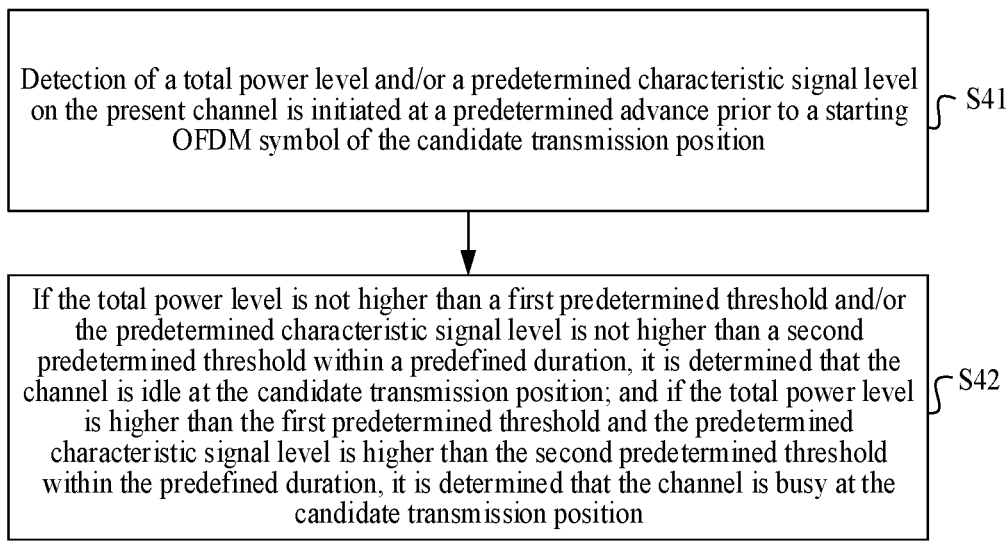
FIG. 4 is an implementation flowchart of a method for determining whether a channel is idle at a candidate transmission position according to the disclosure.

For each candidate transmission position, the determination regarding whether the channel is idle at the candidate transmission position may be performed according to a method illustrated in FIG. 4.

In S41, detection of a total power level and/or a predetermined characteristic signal level on the present channel is initiated at a predetermined advance prior to a starting OFDM symbol of the candidate transmission position.

In S42, if the total power level is not greater than a first predetermined threshold and/or the predetermined characteristic signal level is not greater than a second predetermined threshold within a predefined duration, it is determined that the channel is idle at the candidate transmission position, and if the total power level is greater than the first predetermined threshold and the predetermined characteristic signal level is greater than the second predetermined threshold within the predefined duration, it is determined that the channel is busy at the candidate transmission position.

During the specific implementation, for each candidate transmission position, the UE starts detecting at least one of the total power level or a certain characteristic signal level on the present channel at a predetermined advance T2 (for example, T2=25 us) prior to the starting symbol of the candidate transmission position. If it is detected in a time interval T1 that the total power level is less than a certain predetermined threshold Th1, or it is detected in the time interval T1 that the certain characteristic signal level is less than a certain predetermined threshold Th2 or it is detected in the time interval T1 that the total power level is less than the certain predetermined threshold Th1 and the certain characteristic signal level is less than the certain predetermined threshold Th2, it is determined that the channel is idle at the present candidate transmission position. Otherwise, it is determined that the channel is busy at the present candidate transmission position.

In another implementation mode, the UE starts detecting at least one of the total power level or the certain characteristic signal level on the present channel at a predetermined advance T3 (for example, T3=a length of an OFDM symbol) prior to the starting symbol of the first candidate transmission position and ends channel detecting at a starting moment T4 of the last candidate transmission position.

In the disclosure, a single LBT success event is defined according to the following method. If it is monitored that a total duration when the total power level is less than the certain predetermined threshold Th1 is equal to a certain predetermined duration threshold T6, or it is monitored that a total duration when the certain characteristic signal level is less than the certain predetermined threshold Th2 is equal to the certain predetermined duration threshold T6, or it is simultaneously monitored that the total duration when the total power level is less than the certain predetermined threshold Th1 and the total duration when the certain characteristic signal level is less than the certain predetermined threshold Th2 are equal to the certain predetermined duration threshold T6, it is called a single LBT success.

On such a basis, the disclosure may be implemented according to any one of the following modes.

First Implementation Mode

If no single LBT success event occurs before T4, the UE stops UL transmission of the subframe.

Otherwise, if the single LBT success event occurs at a moment T5 and T5 is less than or equal to T4, the UE determines that a first candidate transmission position after the moment T5 is idle and initiates UL transmission at the candidate transmission position. If there exists a certain time interval between the moment T5 and a starting moment of the first candidate transmission position after the moment T5, the UE keeps sending an occupancy signal till the starting moment of the first candidate transmission position after the moment T5.

Preferably, the occupancy signal and a resource scheduled for the UE on the subframe may share same frequency-domain resources, so as to support UL multi-UE multiplexing.

Second Implementation Mode

A first process: if no single LBT success event occurs before T4, the UE stops UL transmission of the subframe.

Otherwise, if the single LBT success event occurs at the moment T5 and T5 is less than or equal to T4, the UE continues detecting at least one of the total power level or the certain characteristic signal level on the present channel at a predetermined advance T7 (for example, T7=25 us) before the first candidate transmission position after the moment T5. If it is detected in a time interval T7 that the total power level is less than the certain predetermined threshold Th1, or it is detected in the time interval T7 that the certain characteristic signal level is less than the certain predetermined threshold Th2, or it is detected in the time interval T7 that the total power level is less than the certain predetermined threshold Th1 and the certain characteristic signal level is less than the certain predetermined threshold Th2, it is determined that the channel is idle at the first candidate transmission position after the moment T5 and UL transmission is initiated from the candidate transmission position.

Otherwise, the UE continues detecting one or more of the total power level on the present channel and the certain characteristic signal level and ends channel detecting at the starting moment T4 of the last candidate transmission position, and repeatedly performs the first process.

During the specific implementation, the UE, after determining the starting transmission position for the UL signal, may further determine a UL transport block size (TBS). In the disclosure, the UE may determine the UL TBS according to any one of the following implementation modes.

First Implementation Mode

An eNB simultaneously indicates multiple corresponding UL MCS levels for multiple possible candidate transmission positions in a UL grant. The UE selects the UL MCS level matched with a candidate transmission position that is practically used at present from a UL MCS level set indicated in the UL grant according to the practically used candidate transmission position (i.e., the starting transmission position determined in S31). Then, the UE searches a table to obtain the UL TBS according to the practically used UL MCS level and the number of scheduled UL PRBs.

Figure 5:
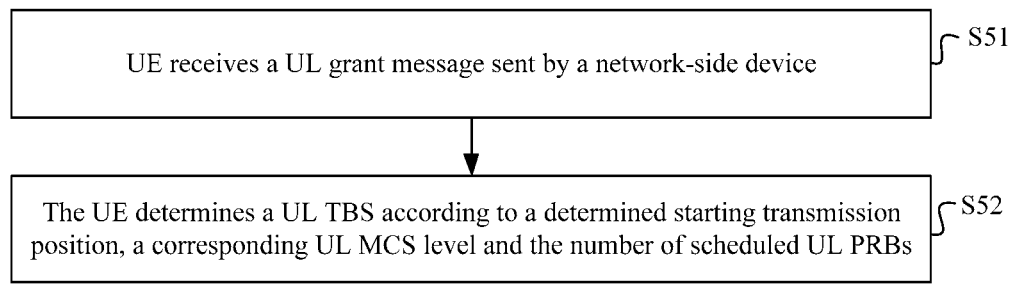
FIG. 5 is a first implementation flowchart of determining a UL TBS according to the disclosure.

On such a basis, the UE may determine the UL TBS according to a flow illustrated in FIG. 5.

In S51, the UE receives a UL grant message sent by a network-side device.

Herein, the UL grant message carries a UL Modulation and Coding Scheme (UL MCS) level corresponding to each candidate transmission position.

In S52, the UE determines a UL TBS according to the determined starting transmission position, the corresponding UL MCS level and the number of scheduled UL PRBs.

Second Implementation Mode

During the specific implementation, a UL TBS may be indexed through <the UL MCS level, the number of the scheduled UL PRBs> in a standard protocol, and thus in the disclosure, the eNB only indicates a default UL MCS level in a UL grant. The UE deduces the UL TBS matched with the candidate transmission position that is practically used at present according to the practically used candidate transmission position and a specific rule. The default UL MCS level corresponds to a UL MCS level used during transmission with a conventional complete UL subframe. For example, a mapping relationship lookup table between a UL TBS and <the default UL MCS level, the number of the scheduled UL PRBs, the number of symbols practically configured for UL transmission except those for a UL DMRS> is specified in the standard protocol. For the Practically used candidate transmission position, the UE calculates the corresponding number of symbols practically configured for UL transmission and may further search the table to obtain the Practically used UL TBS.

Figure 6:
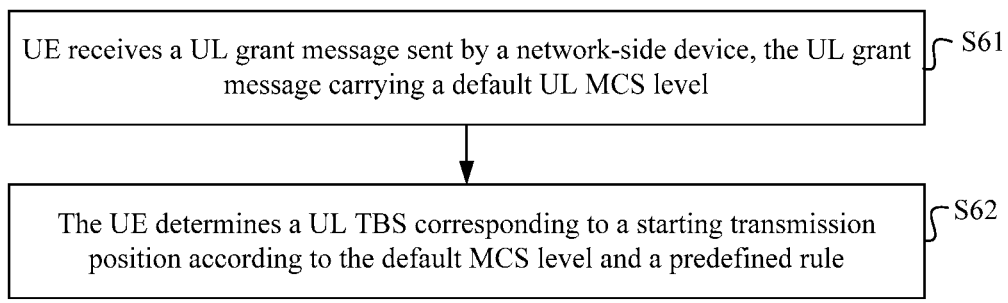
FIG. 6 is a second implementation flowchart of determining a UL TBS according to the disclosure.

On such a basis, the UE may determine the UL TBS according to a flow illustrated in FIG. 6.

In S61, the UE receives a UL grant message sent by the network-side device, and the UL grant message carries a default UL MCS level.

Herein, the default UL MCS level is a UL MCS level used during transmission of the UL signal with a complete UL subframe.

In S62, the UE determines the UL TBS corresponding to the starting transmission position according to the default UL MCS level and a predefined rule.

Figure 7:
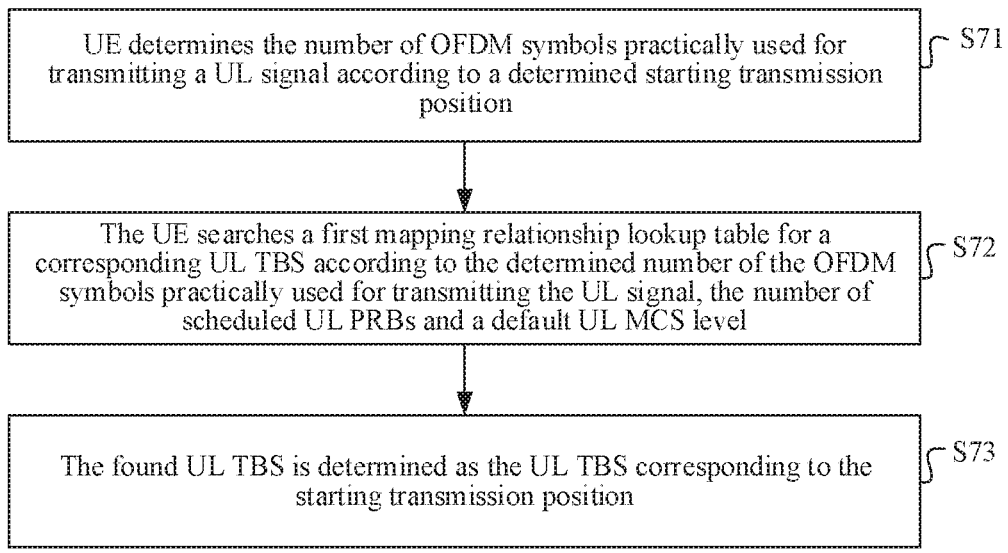
FIG. 7 is a third implementation flowchart of determining a UL TBS according to the disclosure.

In the disclosure, a first mapping relationship lookup table may be predefined, the first mapping relationship lookup table includes a correspondence between a UL TBS and each of a default UL MCS level, the number of scheduled UL PRBs and the number of OFDM symbols practically used for transmitting a UL signal, and the OFDM symbols practically used for transmitting the UL signal may be OFDM symbols except those for transmitting a UL DMRS. The UE may determine the UL TBS according to a flow illustrated in FIG. 7.

In S71, the UE determines the number of OFDM symbols practically used for transmitting the UL signal according to the determined starting transmission position.

In S72, the UE searches the first mapping relationship lookup table for the corresponding UL TBS according to the determined number of the OFDM symbols practically used for transmitting the UL signal, the number of the scheduled UL PRBs and the default UL MCS level.

In S73, the found UL TBS is determined as the UL TBS corresponding to the starting transmission position.

Third Implementation Mode

A UL TBS lookup table in an existing standard protocol is not modified, that is, only a mapping relationship lookup table between a UL TBS and <the default UL MCS level, the number of the scheduled UL PRBs> is defined in a standard. It is known that the number of the symbols practically configured for UL transmission except N1 UL DMRSs in a complete UL subframe is N2 OFDM symbols. For example, N1=2 and N2=12. Then, the UE searches the table to obtain a first TBS according to <the default UL MCS level, the number of the scheduled UL PRBs>. The UE calculates a second TBS=h (the first TBS/N2*n), where n represents the number of the symbols practically configured for UL transmission of the UE according to the Practically used candidate transmission position, and h( ) may be a rounding-up function, a rounding-down function or a rounding function. The second TBS is a TBS Practically used by the UE.

Figure 8:
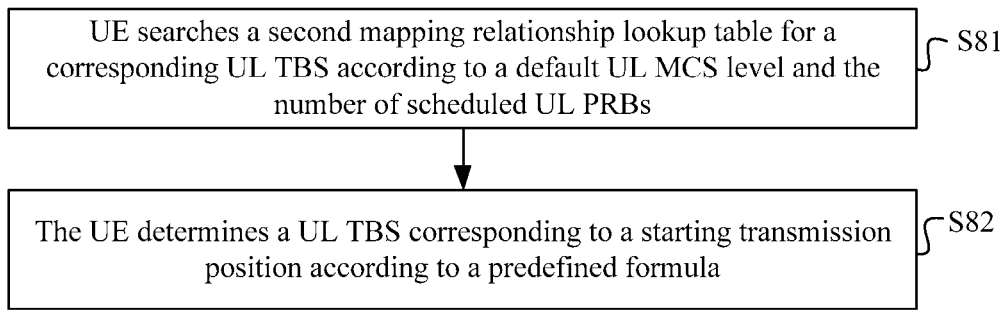
FIG. 8 is a fourth implementation flowchart of determining a UL TBS according to the disclosure.

In the disclosure, a second mapping relationship lookup table may be predefined and the second mapping relationship lookup table includes a correspondence between a UL TBS and each of a default UL MCS level and the number of scheduled UL PRBs. The UE may determine the UL TBS according to a flow illustrated in FIG. 8.

In S81, the UE searches the second mapping relationship lookup table for the corresponding UL TBS according to the default UL MCS level and the number of the scheduled UL PRBs.

In S82, the UE determines the UL TBS corresponding to the starting transmission position according to a predefined formula.

Herein, the UE may determine the UL TBS corresponding to the starting transmission position according to the following formula:

$$h\left(\frac{TBS_1}{N} * n\right).$$

h( ) is a rounding function, or h( ) is a rounding-up function, or h( ) is a rounding-down function; $TBS_1$ is the UL TBS found in the second mapping relationship lookup table according to the default UL MCS level and the number of the scheduled UL PRBs; n is the number, determined according to the starting transmission position, of the OFDM symbols practically used for transmitting the UL signal; and N is the number of the OFDM symbols except those for transmitting the UL DMRS during UL transmission with the complete subframe.

During the specific implementation, for rapid determination of the starting transmission position for UL signal transmission of the UE by an eNB side, in the disclosure, the UL transmission method implemented on the UE side may further include the following operations. A transmission position of a UL DMRS is determined according to the determined starting transmission position and a predefined rule, and the UL DMRS is transmitted at the determined transmission position of the UL DMRS.

For example, a correspondence between a candidate transmission position and a UL DMRS transmission position may be predefined and then the UE may determine the transmission position of the UL DMRS according to the starting transmission position determined in the above operations and the predefined correspondence between the candidate transmission position and the UL DMRS transmission position.

The implementation flow of the UL transmission method on the UE side in the disclosure is introduced above and an implementation flow of a UL transmission method on a base station (eNB) side will be described below in combination with the drawings.

Figure 9:
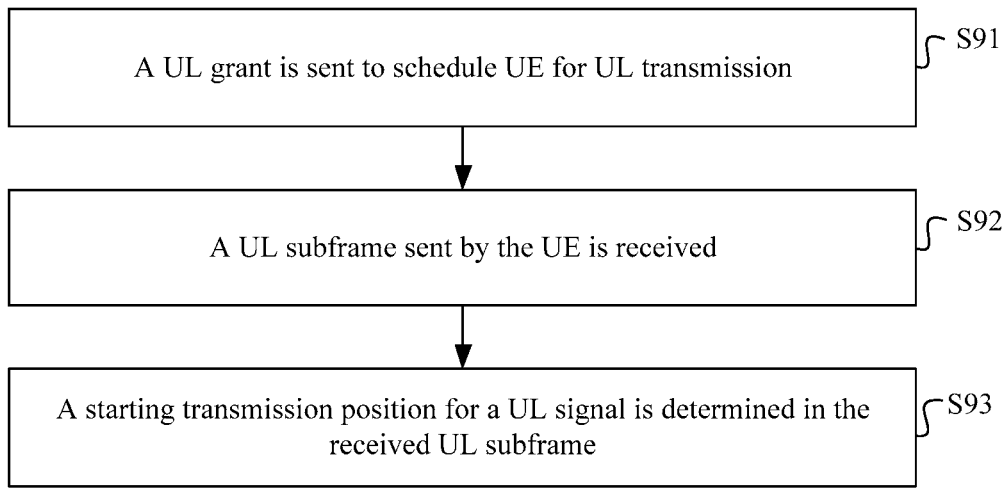
FIG. 9 is an implementation flowchart of a method for transmitting a UL signal implemented on a base station side according to the disclosure.

FIG. 9 is an implementation flowchart of a UL transmission method implemented on an eNB side. The method may include the following operations.

In S91, a UL grant message is sent to schedule UE for UL transmission.

Herein, a UL grant message carries a UL MCS level corresponding to each candidate transmission position.

In S92, a UL subframe sent by the UE is received.

In S93, a starting transmission position for a UL signal is determined in the received UL subframe.

During the specific implementation, an eNB may sequentially make such hypotheses that the UE initiates UL transmission from first to last candidate transmission positions, and for each possible candidate transmission position, attempt to perform data demodulation. If a Cyclic Redundancy Check (CRC) check succeeds after demodulation, it is determined that the UE initiates UL transmission at the corresponding candidate transmission position.

Figure 10:
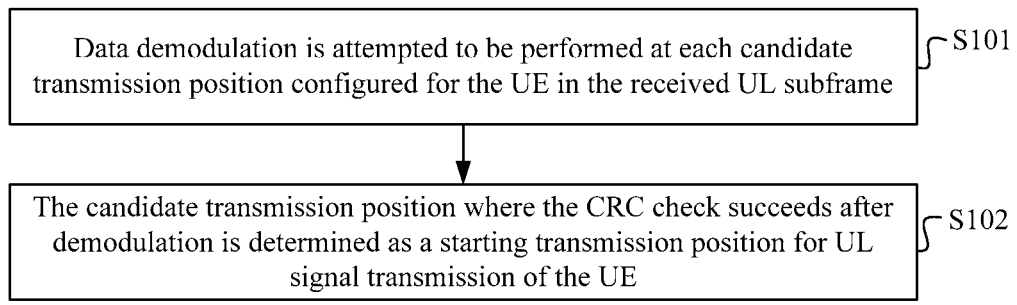
FIG. 10 is a first implementation flowchart of determining a starting transmission position for a UL signal according to the disclosure.

On such a basis, the operation in S92 may be implemented according to a flow illustrated in FIG. 10.

In S101, data demodulation is attempted to be performed at each candidate transmission position configured for the UE in the received UL subframe.

In S102, the candidate transmission position where the CRC check succeeds after demodulation is determined as the starting transmission position for UL signal transmission of the UE.

Such a processing manner has a relatively high requirement on processing complexity of the eNB side. For reducing the processing complexity of the eNB side, in the disclosure, the eNB may also determine the starting transmission position where the UE initiates transmission of the UL signal under assistance of blind detection over existence of a UL DMRS.

Figure 11:
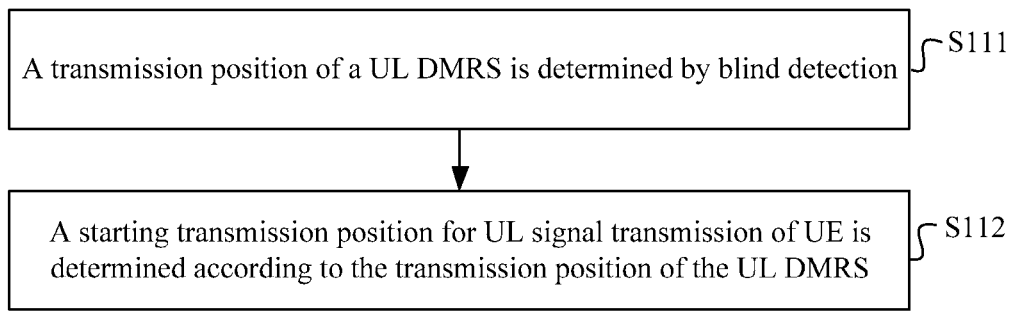
FIG. 11 is a second implementation flowchart of determining a starting transmission position for a UL signal according to the disclosure.

On such a basis, the operation in S92 may be implemented according to a flow illustrated in FIG. 11.

In S111, a transmission position of a UL DMRS is determined by blind detection.

In S112, the starting transmission position for UL signal transmission of the UE is determined according to the transmission position of the UL DMRS.

Herein, in S112, if the UL DMRS is located in a first slot of the UL subframe, it is determined that the starting transmission position for UL signal transmission of the UE is in the first slot of the UL subframe; if the UL DMRS is located in a second slot of the UL subframe, it is determined that the starting transmission position for UL signal transmission of the UE is in the second slot of the UL subframe. If the UL DMRS does not exist in both of the first slot and the second slot, it is determined that the UL signal is not transmitted in the UL subframe.

If there are multiple candidate transmission positions configured for the UE in each slot, the eNB may attempt data demodulation for each candidate transmission position configured for the UE in a slot where the UL DMRS is transmitted and determine the candidate transmission position where the CRC check succeeds after demodulation as the starting transmission position for UL signal transmission of the UE.

In the disclosure, according to a characteristic that a UL DMRS position in an existing LTE system is kept unchanged, that is, there is an OFDM symbol configured to carry a UL DMRS in each slot, if the eNB detects the UL DMRS in the first slot, the eNB determines that the UE initiates UL transmission from a certain candidate transmission position in the first slot. If the eNB does not detect the UL DMRS in the first slot but detects the UL DMRS in the second slot, the eNB determines that the UE initiates UL transmission from a certain candidate transmission position in the second slot. If the eNB does not detect the UL DMRS in both of the two slots, the eNB determines that the UE does not perform UL transmission in the UL subframe.

Particularly, if there is only one candidate transmission position configured in each slot, the eNB may determine the specific candidate transmission position where the UE initiates UL transmission through the above principle.

Assume that the candidate transmission position is {a 25th us after a starting boundary of a zeroth OFDM symbol} or {the 25th us after the starting boundary of the zeroth OFDM symbol, a starting boundary of a seventh OFDM symbol}. In another embodiment, assume that the candidate transmission position may be {a starting boundary of a first OFDM symbol} or {the starting boundary of the first OFDM symbol, the starting boundary of the seventh OFDM symbol}, as illustrated in FIG. 2. Due to different processing capabilities of different UE, the eNB configures multiple sets of candidate starting position transmission modes.

Particularly, if at least one candidate transmission position is configured in a certain slot, the eNB may perform blind detection on existence of the UL DMRS, determine the specific slot where the UE initiates UL transmission at first and then further determine the specific candidate transmission position where the UE initiates UL transmission in the present slot in combination with a blind detection technology.

Figure 12A:
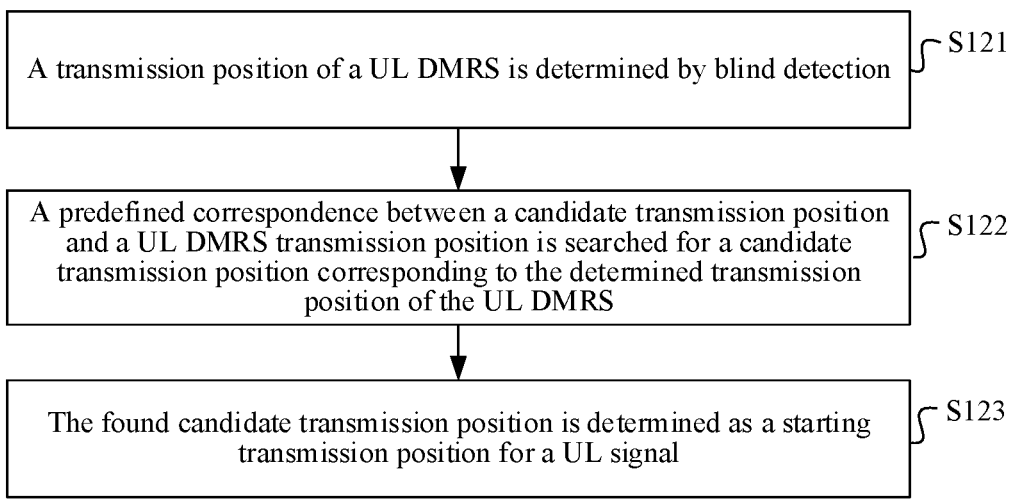
FIG. 12a is a third implementation flowchart of determining a starting transmission position for a UL signal according to the disclosure.

In another embodiment, a correspondence between a candidate transmission position and a UL DMRS transmission position may further be predefined. Then the operation in S92 is implemented according to a flow illustrated in FIG. 12a.

In S121, a transmission position of a UL DMRS is determined by blind detection.

In S122, the predefined correspondence between the candidate transmission position and the UL DMRS transmission position is searched for a candidate transmission position corresponding to the determined transmission position of the UL DMRS.

In S123, the found candidate transmission position is determined as the starting transmission position for the UL signal.

In the implementation mode, the eNB determines the starting transmission position where the UE initiates transmission of the UL signal under the assistance of blind detection over existence of the UL DMRS and a symbol position for the UL DMRS. According to a characteristic that a UL DMRS density in the existing LTE system is kept unchanged, that is, there is an OFDM symbol configured to carry a UL DMRS in each slot, a one-to-one mapping between a UL DMRS position and a practically used starting transmission position may be predefined. The UE determines the specific OFDM symbol where the UL DMRS is sent according to the practically used starting transmission position. The eNB determines the candidate transmission position where the UE initiates UL transmission according to the practically detected UL DMRS position.

Figure 12B:
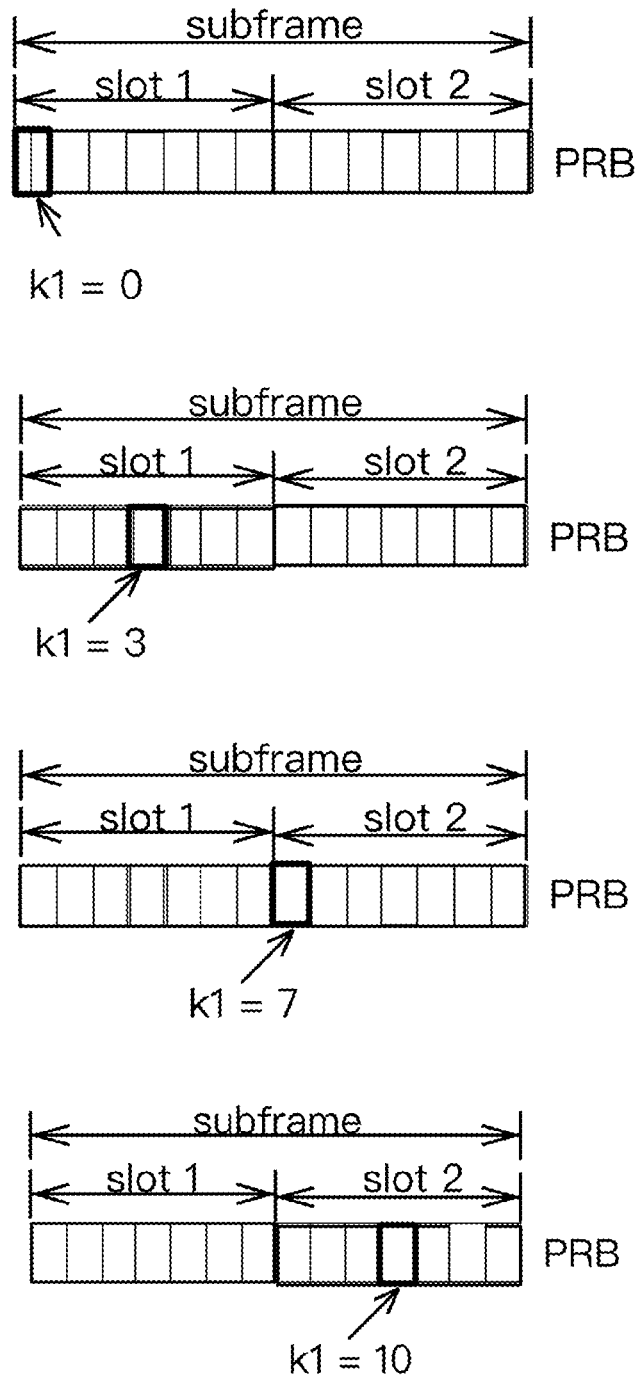
FIG. 12b is a first schematic diagram of a UL subframe according to the disclosure.

As illustrated in FIG. 12b, if there are two candidate transmission positions in each slot, there are four candidate transmission positions in each UL subframe and the candidate transmission positions are {the 25th us after the starting boundary of the zeroth OFDM symbol, a starting boundary of a third OFDM symbol, the starting boundary of the seventh OFDM symbol, a starting boundary of a tenth OFDM symbol}, or {the starting boundary of the zeroth OFDM symbol, the starting boundary of the third OFDM symbol, the starting boundary of the seventh OFDM symbol, the starting boundary of the tenth OFDM symbol}. When the UE starts UL transmission at a first candidate transmission position, the UE sends a first UL DMRS in the third OFDM symbol and sends a second UL DMRS in the tenth OFDM symbol. Except a UL DMRS overhead, the UE practically adopts 12 OFDM symbols for data transmission. When the UE starts UL transmission at a second candidate transmission position, the UE simultaneously sends the first UL DMRS in a fourth or fifth OFDM symbol and sends the second UL DMRS in the tenth OFDM symbol. Except the UL DMRS overhead, the UE practically adopts 9 OFDM symbols for data transmission. When the UE starts UL transmission at a third candidate transmission position, the UE sends the first UL DMRS in the tenth OFDM symbol. Except the UL DMRS overhead, the UE practically adopts 6 OFDM symbols for data transmission. When the UE starts UL transmission at a fourth candidate transmission position, the UE sends the first UL DMRS in an eleventh or twelfth OFDM symbol. Except the UL DMRS overhead, the UE practically adopts three OFDM symbols for data transmission. Table 1 is a first mapping relationship table between a UL DMRS position and a starting transmission position where the UE starts transmitting the UL signal.

TABLE 1

| Sequence number | Practically used candidate transmission position | UL DMRS position |
|---|---|---|
| 1 | The 25th us after the starting boundary of the zeroth OFDM symbol, or the starting boundary of the zeroth OFDM symbol | The first UL DMRS is sent in the third OFDM symbol and the second UL DMRS is sent in the tenth OFDM symbol |
| 2 | The starting boundary of the third OFDM symbol | The first UL DMRS is sent in the fourth or fifth OFDM symbol and the second UL DMRS is sent in the tenth OFDM symbol |
| 3 | The starting boundary of the seventh OFDM symbol | The first UL DMRS is sent in the tenth OFDM symbol |
| 4 | The starting boundary of the tenth OFDM symbol | The first UL DMRS is sent in the eleventh or twelfth OFDM symbol |

Figure 12C:
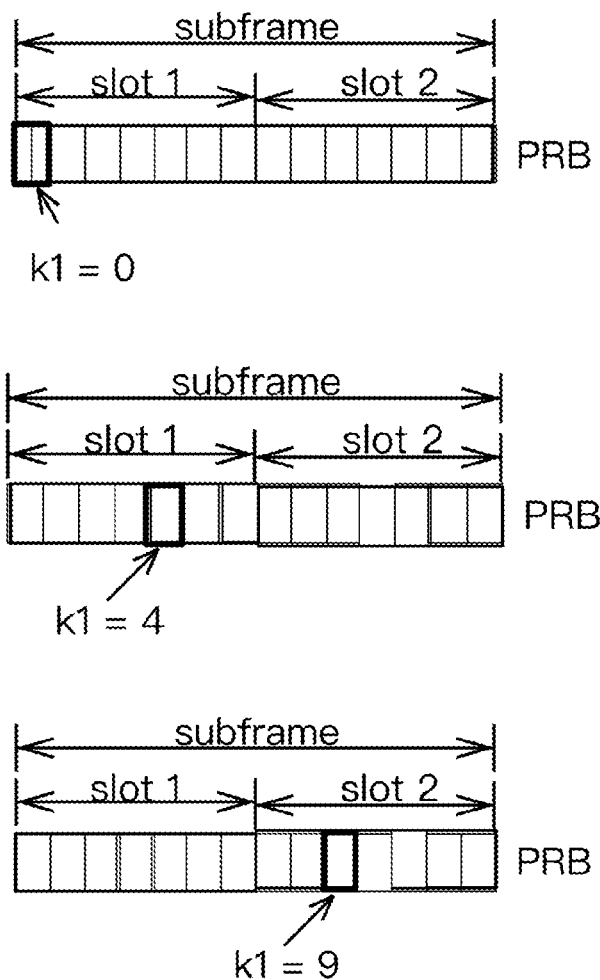
FIG. 12c is a second schematic diagram of a UL subframe according to the disclosure.

As illustrated in FIG. 12c, if it is assumed that there are three candidate transmission positions in each UL subframe, the candidate transmission positions are {the 25th us after the starting boundary of the zeroth OFDM symbol, a starting boundary of the fourth OFDM symbol, a starting boundary of the ninth OFDM symbol}, or {the starting boundary of the zeroth OFDM symbol, the starting boundary of the fourth OFDM symbol, the starting boundary of the ninth OFDM symbol}. When the UE starts UL transmission at the first candidate transmission position, the UE sends the first UL DMRS in the third OFDM symbol and sends the second UL DMRS in the tenth OFDM symbol. Except the UL DMRS overhead, the UE practically adopts 12 OFDM symbols for data transmission. When the UE starts UL transmission at the second candidate transmission position, the UE simultaneously sends the first UL DMRS in the fifth or sixth OFDM symbol (preferably the sixth OFDM symbol) and sends the second UL DMRS in the tenth or eleventh OFDM symbol (preferably the eleventh OFDM symbol). Except the UL DMRS overhead, the UE practically adopts 8 OFDM symbols for data transmission. When the UE starts UL transmission at the third candidate transmission position, the UE sends the first UL DMRS in the tenth or eleventh or twelfth OFDM symbol (preferably the eleventh OFDM symbol). Except the UL DMRS overhead, the UE practically adopts 4 OFDM symbols for data transmission. Table 2 is a second mapping relationship table between a UL DMRS position and a starting transmission position where the UE starts transmitting the UL signal.

TABLE 2

| Sequence number | Practically used candidate transmission position | UL DMRS position |
|---|---|---|
| 1 | The 25th us after the starting boundary of the zeroth OFDM symbol, or the starting boundary of the zeroth OFDM symbol | The first UL DMRS is sent in the third OFDM symbol and the second UL DMRS is sent in the tenth OFDM symbol |
| 2 | The starting boundary of the fourth OFDM symbol | The first UL DMRS is sent in the fifth or sixth OFDM symbol and the second UL DMRS is sent in the tenth or eleventh OFDM symbol |
| 3 | The starting boundary of the ninth OFDM symbol | The first UL DMRS is sent in the tenth or eleventh or twelfth OFDM symbol |

Figure 12D:
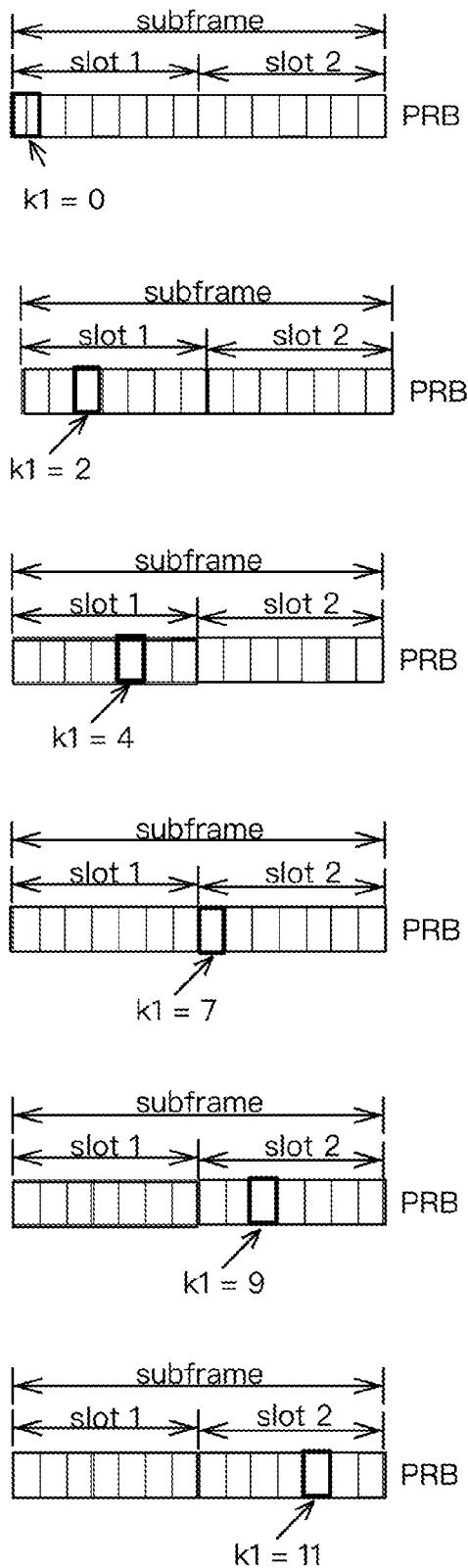
FIG. 12d is a third schematic diagram of a UL subframe according to the disclosure.

As illustrated in FIG. 12d, if it is assumed that there are three candidate starting transmission positions in each slot, there are 6 candidate starting transmission positions in each UL subframe and the candidate starting transmission positions are {the 25th us after the starting boundary of the zeroth OFDM symbol, the starting boundary of the second OFDM symbol, the starting boundary of the fourth OFDM symbol, the starting boundary of the seventh OFDM symbol, the starting boundary of the ninth OFDM symbol, the starting boundary of the eleventh OFDM symbol}, or {the starting boundary of the zeroth OFDM symbol, the starting boundary of the second OFDM symbol, the starting boundary of the fourth OFDM symbol, the starting boundary of the seventh OFDM symbol, the starting boundary of the ninth OFDM symbol, the starting boundary of the eleventh OFDM symbol}. When the UE starts UL transmission at a first candidate starting transmission position, the UE sends the first UL DMRS in the third OFDM symbol and sends the second UL DMRS in the tenth OFDM symbol. Except the UL DMRS overhead, the UE practically adopts 12 OFDM symbols for data transmission. When the UE starts UL transmission at a second starting transmission position, the UE simultaneously sends the first UL DMRS in the third or fourth or fifth OFDM symbol (preferably the fourth OFDM symbol) and sends the second OFDM in the tenth OFDM symbol. Except the UL DMRS overhead, the UE practically adopts 10 OFDM symbols for data transmission. When the UE starts UL transmission at a third candidate starting transmission position, the UE simultaneously sends the first UL DMRS in the fifth or sixth OFDM symbol (preferably the sixth OFDM symbol) and sends the second UL DMRS in the tenth OFDM symbol. Except the UL DMRS overhead, the UE practically adopts 8 OFDM symbols for data transmission. When the UE starts UL transmission at a fourth candidate starting transmission position, the UE sends the first UL DMRS in the tenth OFDM symbol. Except the UL DMRS overhead, the UE practically adopts 6 OFDM symbols for data transmission. When the UE starts UL transmission at a fifth candidate starting transmission position, the UE sends the first UL DMRS in the tenth or eleventh or twelfth OFDM symbol (preferably the eleventh OFDM symbol). Except the UL DMRS overhead, the UE practically adopts 4 OFDM symbols for data transmission. When the UE starts UL transmission at a sixth candidate starting transmission position, the UE sends the first UL DMRS in the twelfth or thirteenth OFDM symbol (preferably the twelfth OFDM symbol). Except the UL DMRS overhead, the UE practically adopts 2 OFDM symbols for data transmission. Table 3 is a third mapping relationship table between a UL DMRS position and a starting transmission position where the UE starts transmitting the UL signal.

TABLE 3

| Sequence number | Practically used candidate transmission position | UL DMRS position |
|---|---|---|
| 1 | The 25th us after the starting boundary of the zeroth OFDM symbol, or the starting boundary of the zeroth OFDM symbol | The first UL DMRS is sent in the third OFDM symbol and the second UL DMRS is sent in the tenth OFDM symbol |
| 2 | The starting boundary of the second OFDM symbol | The first UL DMRS is sent in the third or fourth or fifth OFDM symbol and the second UL DMRS is sent in the tenth OFDM symbol |
| 3 | The starting boundary of the fourth OFDM symbol | The first UL DMRS is sent in the fifth or sixth OFDM symbol and the second UL DMRS is sent in the tenth OFDM symbol |
| 4 | The starting boundary of the seventh OFDM symbol | The first UL DMRS is sent in the tenth OFDM symbol |
| 5 | The starting boundary of the ninth OFDM symbol | The first UL DMRS is sent in the tenth or eleventh or twelfth OFDM symbol |
| 6 | The starting boundary of the eleventh OFDM symbol | The first UL DMRS is sent in the twelfth or thirteenth OFDM symbol |

During the specific implementation, the eNB, after determining the specific candidate transmission position where the UE starts transmitting the UL signal, may further determine the TBS Practically used by the UE. Since a method for determining the TBS by the eNB is similar to a method for determining the TBS by the UE, specific implementation thereof may refer to implementation of determination of the TBS by the UE and will not be elaborated herein.

In the method for transmitting a UL signal provided in the disclosure, the at least one candidate transmission position is configured for the UE in the UL subframe, and then the UE may select the corresponding candidate transmission position as the practically used starting transmission position according to the LBT result, so that an access opportunity of the UE is ensured and utilization efficiency of a transmission resource is improved. Moreover, the UE is not required to send an occupancy signal to wait for transmission, so that a channel resource overhead is effectively reduced.

Based on the same inventive concept, the disclosure also provides devices for transmitting a UL signal implemented on a UE side and an eNB side and a UL signal transmission system. Since the devices and the system have a similar principle for solving the problem to the method for transmitting a UL signal, implementation of the devices and the system may refer to implementation of the method and repeated parts will not be elaborated.

Figure 13:
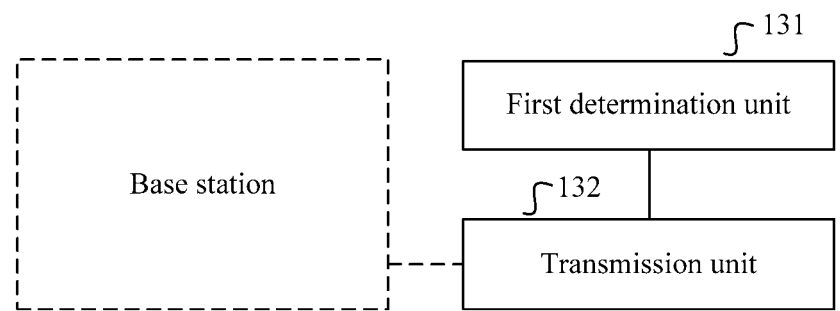
FIG. 13 is a schematic structure diagram of a device for transmitting a UL signal implemented on a UE side according to the disclosure.

As illustrated in FIG. 13, FIG. 13 is a schematic structure diagram of a device for transmitting a UL signal implemented on a UE side according to the disclosure. The device may include a first determination unit 131 and a transmission unit 132.

The first determination unit 131 is configured to determine a starting transmission position for transmission of a UL signal from at least one predefined candidate transmission position according to a predefined rule.

Herein, the at least one predefined candidate transmission position is predetermined by a network-side device and UE. Alternatively, the at least one candidate transmission position is preconfigured by the network-side device and indicate to the UE through system information or RRC signaling.

Preferably, the first determination unit 131 may be configured to determine the starting transmission position for transmission of the UL signal from the at least one predefined candidate transmission position according to an LBT result.

Preferably, the candidate transmission position starts from a starting boundary of a kth OFDM symbol of a UL subframe. Alternatively, the candidate transmission position starts from a specified time offset of the kth OFDM symbol of the UL subframe.

The transmission unit 132 is configured to initiate transmission of the UL signal at the determined starting transmission position.

Optionally, the first determination unit 131 includes a sensing subunit and a first determination subunit.

The sensing subunit may be configured to, for each UL subframe, sequentially sense through the UE whether a channel is idle at each candidate transmission position in the UL subframe from a first candidate transmission position of the UL subframe till sensing a candidate transmission position where the channel is idle.

The first determination subunit may be configured to determine the candidate transmission position where the channel is idle as the starting transmission position for transmission of the UL signal.

Optionally, the first determination unit 131 may further include a stopping subunit.

The stopping subunit may be configured to, if the sensing subunit detects that the channel is busy at all the candidate transmission positions in the UL subframe, stop transmission of the UL signal in the UL subframe.

Preferably, the sensing subunit may include a sensing module and a first determination module.

The sensing module may be configured to initiate detection of a total power level and/or a predetermined characteristic signal level on the present channel at a predetermined advance prior to a starting OFDM symbol of the candidate transmission position.

The first determination module may be configured to, if the total power level is not greater than a first predetermined threshold and/or the predetermined characteristic signal level is not greater than a second predetermined threshold in a predefined duration, determine that the channel is idle at the candidate transmission position, and if the total power level is greater than the first predetermined threshold and the predetermined characteristic signal level is greater than the second predetermined threshold in the predefined duration, determine that the channel is busy at the candidate transmission position.

Optionally, the device for transmitting a UL signal provided in the disclosure may further include a first receiving unit and a second determination unit.

The first receiving unit may be configured to receive a UL grant message sent by the network-side device. The UL grant message carries a UL MCS level corresponding to each candidate transmission position.

The second determination unit may be configured to determine a UL TBS according to the determined starting transmission position, the corresponding UL MCS level and the number of scheduled UL PRBs.

Optionally, the device for transmitting a UL signal provided in the disclosure may further include a second receiving unit and a third determination unit.

The second receiving unit may be configured to receive the UL grant message sent by the network-side device, the UL grant message carrying a default UL MCS level and the default UL MCS being a UL MCS level used during transmission of the UL signal with a complete UL subframe.

The third determination unit may be configured to determine the UL TBS corresponding to the starting transmission position according to the default UL MCS level and a predefined rule.

During the specific implementation, a first mapping relationship lookup table may further be predefined, the first mapping relationship lookup table includes a correspondence between a UL TBS and each of a default UL MCS level, the number of scheduled UL PRBs and the number of OFDM symbols practically used for transmitting a UL signal. The OFDM symbols practically used for transmitting the UL signal are OFDM symbols except those for transmitting a UL DMRS.

The third determination unit may include a second determination module, a first searching module and a third determination module.

The second determination module may be configured to determine the number of OFDM symbols practically used for transmitting the UL signal according to the determined starting transmission position.

The first searching module may be configured to search the first mapping relationship lookup table for the corresponding UL TBS according to the determined number of the OFDM symbols practically used for transmitting the UL signal, the number of the scheduled UL PRBs and the default UL MCS level.

The third determination module may be configured to determine the found UL TBS as the UL TBS corresponding to the starting transmission position.

During the specific implementation, a second mapping relationship lookup table may further be predefined and the second mapping relationship lookup table includes a correspondence between a UL TBS and each of a default UL MCS level and the number of scheduled UL PRBs.

The third determination unit may include a second searching module and a fourth determination module.

The second searching module may be configured to search the second mapping relationship lookup table for the corresponding UL TBS according to the default UL MCS level and the number of the scheduled UL PRBs.

The fourth determination module may be configured to determine the UL TBS corresponding to the starting transmission position according to the following formula:

$$h\left(\frac{TBS_1}{N} * n\right).$$

h( ) is a rounding function, or h( ) is a rounding-up function, or h( ) is a rounding-down function; $TBS_1$ is the UL TBS found in the second mapping relationship lookup table according to the default UL MCS level and the number of the scheduled UL PRBs; n is the number, determined according to the starting transmission position, of the OFDM symbols practically used for transmitting the UL signal; and N is the number of the OFDM symbols except those for transmitting the UL DMRS during UL transmission with the complete subframe.

Optionally, the UL transmission device implemented on the UE side may further include a fourth determination unit.

The fourth determination unit may be configured to determine a transmission position of a UL DMRS according to the determined starting transmission position and a predefined rule.

The transmission unit may be configured to transmit the UL DMRS at the determined transmission position of the UL DMRS.

Herein, the fourth determination unit may be configured to determine the transmission position of the UL DMRS according to the determined starting transmission position and a predefined correspondence between a candidate transmission position and a UL DMRS transmission position.

For convenient description, each part may be divided into each module (or unit) for respective description according to functions. Of course, when the disclosure is implemented, the functions of each module (or unit) may be realized in one or more pieces of software or hardware. For example, the device for transmitting a UL signal implemented on the UE side may be arranged in the UE.

Figure 14:
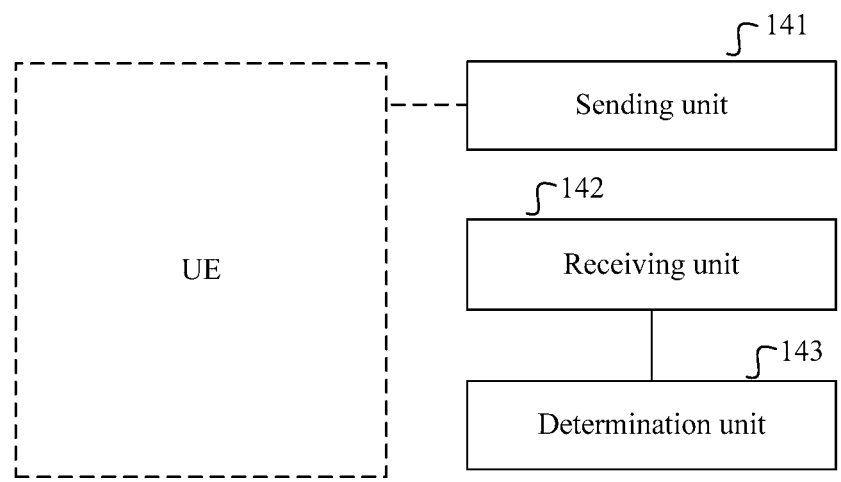
FIG. 14 is a schematic structure diagram of a device for transmitting a UL signal implemented on a base station side according to the disclosure.

As illustrated in FIG. 14, FIG. 14 is a schematic structure diagram of a device for transmitting a UL signal implemented on a base station side according to the disclosure. The device may include a sending unit 141, a receiving unit 142 and a determination unit 143.

The sending unit 141 is configured to send a UL grant message to schedule UE for UL transmission.

The receiving unit 142 is configured to receive a UL subframe sent by the UE.

The determination unit 143 is configured to determine a starting transmission position for a UL signal in the UL subframe.

Preferably, a UL grant message carries a UL MCS level corresponding to each candidate transmission position.

During the specific implementation, the determination unit 143 may include a first data demodulation subunit and a first determination subunit.

The first data demodulation subunit may be configured to attempt to perform data demodulation at each candidate transmission position configured for the UE in the UL subframe.

The first determination subunit may be configured to determine the candidate transmission position where a CRC check succeeds after demodulation as the starting transmission position for UL signal transmission of the UE.

During the specific implementation, the determination unit 143 may include a second determination subunit and a third determination subunit.

The second determination subunit may be configured to determine a transmission position of a UL DMRS by blind detection.

The third determination subunit may be configured to determine the starting transmission position for UL signal transmission of the UE according to the transmission position of the UL DMRS.

Preferably, the third determination subunit may specifically be configured to, determine that the starting transmission position for UL signal transmission of the UE is in the first slot of the UL subframe when the UL DMRS is located in a first slot of the UL subframe, determine that the starting transmission position for UL signal transmission of the UE is in the second slot of the UL subframe when the UL DMRS is located in a second slot of the UL subframe, and determine that the UL signal is not transmitted in the UL subframe when the UL DMRS does not exist in both of the first slot and the second slot.

Optionally, the determination unit 143 may further include a second data demodulation subunit and a fourth determination subunit.

The second data demodulation subunit may be configured to, when there are multiple candidate transmission positions configured for the UE in each slot, attempt to perform data demodulation at each candidate transmission position configured for the UE in a slot where the UL DMRS is transmitted.

The fourth determination subunit may be configured to determine the candidate transmission position where the CRC check succeeds after demodulation as the starting transmission position for UL signal transmission of the UE.

During the specific implementation, the determination unit 143 may specifically include a predefinition subunit, a fifth determination subunit, a searching subunit and a sixth determination subunit.

The predefinition subunit may be configured to predefine a correspondence between a candidate transmission position and a UL DMRS transmission position.

The fifth determination subunit may be configured to determine the transmission position of the UL DMRS by blind detection.

The searching subunit may be configured to search the predefined correspondence between the candidate transmission position and the UL DMRS transmission position for a candidate transmission position corresponding to the determined transmission position of the UL DMRS.

The sixth determination subunit may be configured to determine the candidate transmission position found by the searching subunit as the starting transmission position for the UL signal.

For convenient description, each part may be divided into each module (or unit) for respective description according to functions. Of course, when the disclosure is implemented, the functions of each module (or unit) may be realized in one or more pieces of software or hardware. For example, the device for transmitting a UL signal implemented on the eNB side may be arranged in an eNB.

Figure 15:
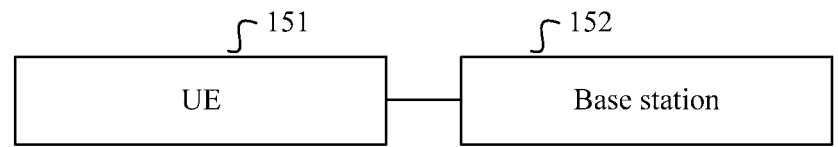
FIG. 15 is a schematic structure diagram of a system for transmitting a UL signal according to the disclosure.

As illustrated in FIG. 15, FIG. 15 is a schematic structure diagram of a system for transmitting a UL signal provided in the disclosure. The system may include UE 151 and a base station (eNB) 152. The UE 151 configures with the device for transmitting a UL signal implemented on the UE side and the eNB 152 configures with the device for transmitting a UL signal implemented on the eNB side.

An embodiment of the disclosure also provides a communication device, which may include at least one processor, a memory and at least one network interface. Components are coupled together through a bus system. It can be understood that the bus system is configured to implement connection communication between these components. The bus system includes a data bus and further includes a power bus, a control bus and a state signal bus. However, for clear description, various buses in FIG. 4 are denoted as the bus system.

It can be understood that the memory in the embodiment of the disclosure may be a volatile memory or a nonvolatile memory, or may include both the volatile and nonvolatile memories.

In some implementation modes, the memory stores the following elements, executable modules or data structures, or a subset thereof or an extended set thereof: an operating system and an application program.

Herein, the processor is configured to be capable of processing the operations of the method in the abovementioned embodiments, which will not be elaborated herein.

An embodiment of the disclosure provides a computer storage medium, which stores a computer-executable instruction, the computer-executable instruction being executed to implement the operations of the method of the abovementioned embodiments.

Those skilled in the art should know that the embodiment of the disclosure may be provided as a method, a system or a computer program product. Therefore, the disclosure may adopt a form of pure hardware embodiment, pure software embodiment or combined software and hardware embodiment. Moreover, the disclosure may adopt a form of computer program product implemented on one or more computer-available storage media (including, but not limited to, a disk memory, a Compact Disc Read-Only Memory (CD-ROM) and an optical memory) including computer-available program codes.

The disclosure is described with reference to flowcharts and/or block diagrams of the method, device (system) and computer program product according to the disclosure. It is to be understood that each flow and/or block in the flowcharts and/or the block diagrams and combinations of the flows and/or blocks in the flowcharts and/or the block diagrams may be implemented by computer program instructions. These computer program instructions may be provided for a universal computer, a dedicated computer, an embedded processor or a processor of another programmable data processing device to generate a machine, so that a device for realizing a function specified in one flow or multiple flows in the flowcharts and/or one block or multiple blocks in the block diagrams is generated by the instructions executed through the computer or the processor of the other programmable data processing device.

These computer program instructions may also be stored in a computer-readable memory capable of guiding the computer or the other programmable data processing device to work in a specific manner, so that a product including an instruction device may be generated by the instructions stored in the computer-readable memory, the instruction device realizing the function specified in one flow or multiple flows in the flowcharts and/or one block or multiple blocks in the block diagrams.

These computer program instructions may further be loaded onto the computer or the other programmable data processing device, so that a series of operating operations are executed on the computer or the other programmable data processing device to generate processing implemented by the computer, and operations for realizing the function specified in one flow or multiple flows in the flowcharts and/or one block or multiple blocks in the block diagrams are provided by the instructions executed on the computer or the other programmable data processing device.

Although the preferred embodiments of the disclosure have been described, those skilled in the art, once learning about basic creative concepts, may make other variations and modifications to these embodiments. Therefore, it is intended to explain the appended claims to include the preferred embodiments and all the variations and modifications falling within the scope of the disclosure.

It is apparent that those skilled in the art may make various modifications and transformations to the disclosure without departing from the spirit and scope of the disclosure. Therefore, if these modifications and transformations of the disclosure fall within the scopes of the claims of the disclosure and equivalent technologies thereof, the disclosure is also intended to include these modifications and transformations.

The invention claimed is:

1. A method for transmitting an uplink (UL) signal, applied into a terminal side and comprising:
   determining, by User Equipment (UE), according to a Listen Before Talk (LBT) result, a starting transmission position for transmission of the UL signal from at least one predefined candidate transmission position; and
   starting, by the UE, a transmission of the UL signal at the determined starting transmission position,
   wherein the determining, by the UE, according to the LBT result, the starting transmission position for transmission of the UL signal from the at least one predefined candidate transmission position comprises:
   for a UL subframe, sequentially sensing, by the UE, whether a channel is idle before each candidate transmission position in the UL subframe from a first candidate transmission position of the UL subframe, until sensing a candidate transmission position when the channel is idle before the candidate transmission position; and
   determining the candidate transmission position when the channel is idle before the candidate transmission position as the starting transmission position for transmission of the UL signal; and
   wherein, for each candidate transmission position, the determination regarding whether the channel is idle before the candidate transmission position is made according to the following method:
   starting detection of at least one of a total power level or a predetermined characteristic signal level on the present channel at a predetermined advance prior to the candidate transmission position;
   when the total power level is less than a first predetermined threshold and/or the predetermined characteristic signal level is less than a second predetermined threshold within a predefined duration, determining that the channel is idle before the candidate transmission position; or
   when the total power level is not less than the first predetermined threshold and the predetermined characteristic signal level is not less than the second predetermined threshold within the predefined duration, determining that the channel is busy before the candidate transmission.

2. The method of claim 1, wherein
the at least one predefined candidate transmission position is predetermined by a network-side device and the UE;
or, the at least one candidate transmission position is preconfigured by the network-side device and indicated to the UE through system information or Radio Resource Control (RRC) signaling.

3. The method of claim 1, further comprising:
receiving, by the UE, a UL grant message sent by the network-side device, the UL grant message carrying a UL Modulation and Coding Scheme (UL MCS) level corresponding to each candidate transmission position; and
determining, by the UE, a UL Transport Block Size (TBS) according to the determined starting transmission position, the corresponding UL MCS level and a number of scheduled UL Physical Resource Blocks (PRBs).

4. The method of claim 1, further comprising:
receiving, by the UE, a UL grant message sent by the network-side device, the UL grant message carrying a default UL MCS level and the default UL MCS being a UL MCS level used during transmission of the UL signal with a complete UL subframe; and
determining, by the UE, a UL TBS corresponding to the starting transmission position according to the default UL MCS level.

5. The method of claim 4, wherein a first mapping relationship lookup table is predefined, the first mapping relationship lookup table comprises a correspondence between a UL TBS and each of a default UL MCS level, a number of scheduled UL PRBs and a number of OFDM symbols practically used for transmitting a UL signal, and the OFDM symbols practically used for transmitting the UL signal are OFDM symbols except those for transmitting a UL Demodulation Reference Signal (DMRS).

6. The method of claim 5, wherein determining, by the UE, the UL TBS corresponding to the starting transmission position according to the default UL MCS level specifically comprises:
determining, by the UE, the number of OFDM symbols practically used for transmitting the UL signal according to the determined starting transmission position;
searching the first mapping relationship lookup table for the UL TBS according to the determined number of the OFDM symbols practically used for transmitting the UL signal, the number of the scheduled UL PRBs and the default UL MCS level; and
determining the found UL TBS as the UL TBS corresponding to the starting transmission position.

7. The method of claim 4, wherein a second mapping relationship lookup table is predefined, and the second mapping relationship lookup table comprises a correspondence between a UL TBS and each of a default UL MCS level and a number of scheduled UL PRBs; and
determining, by the UE, the UL TBS corresponding to the starting transmission position according to the default UL MCS level specifically comprises:
searching, by the UE, the second mapping relationship lookup table for the UL TBS according to the default UL MCS level and the number of the scheduled UL PRBs; and
determining the UL TBS corresponding to the starting transmission position according to the following formula:

$$h\left(\frac{TBS_1}{N} * n\right),$$

where $h()$ is a rounding function, or $h()$ is a rounding-up function, or $h()$ is a rounding-down function;
$TBS_1$ is the found UL TBS in the second mapping relationship lookup table according to the default UL MCS level and the number of the scheduled UL PRBs;
n is the number, determined according to the starting transmission position, of the OFDM symbols practically used for transmitting the UL signal; and
N is the number of the OFDM symbols except those for transmitting the UL DMRS during UL transmission with the complete subframe.

8. The method of claim 1, further comprising:
determining a transmission position of a UL DMRS according to the determined starting transmission position and a predefined rule; and
transmitting the UL DMRS at the determined transmission position of the UL DMRS.

9. The method of claim 8, wherein determining the transmission position of the UL DMRS according to the determined starting transmission position and the predefined rule specifically comprises:
determining the transmission position of the UL DMRS according to the determined starting transmission position and a predefined correspondence between a candidate transmission position and a UL DMRS transmission position.

10. The method of claim 1, wherein the candidate transmission position starts form the starting boundary of a kth Orthogonal Frequency Division Multiplexing (OFDM) symbol of a UL subframe;
or, the candidate transmission position starts from a specified time offset of the kth OFMD symbol of the UL subframe;
wherein k is an integer.

11. A method for transmitting an uplink (UL) signal, applied into a base station side and comprising:
sending a UL grant message to schedule User Equipment (UE) for UL transmission;
receiving a UL subframe sent by the UE; and
determining a starting transmission position for a UL signal in the UL subframe, wherein determining the starting transmission position for the UL signal in the UL subframe specifically comprises:
attempting to perform data demodulation at each candidate transmission position configured for the UE in the UL subframe; and
determining the candidate transmission position where a Cyclic Redundancy Check (CRC) check succeeds after demodulation as the starting transmission position for UL signal transmission of the UE.

12. The method of claim 11, wherein a UL grant message carries a UL Modulation and Coding Scheme (UL MCS) level corresponding to each candidate transmission position.

13. The method of claim 11, wherein determining the starting transmission position for the UL signal in the UL subframe specifically comprises:
determining a transmission position of a UL Demodulation Reference Signal (DMRS) by blind detection; and
determining the starting transmission position for UL signal transmission of the UE according to the transmission position of the UL DMRS.

14. The method of claim 13, wherein determining the starting transmission position for UL signal transmission of the UE according to the transmission position of the UL DMRS specifically comprises:
- when the UL DMRS is located in a first slot of the UL subframe, determining that the starting transmission position for UL signal transmission of the UE is in the first slot of the UL subframe;
- when the UL DMRS is located in a second slot of the UL subframe, determining that the starting transmission position for UL signal transmission of the UE is in the second slot of the UL subframe; and
- when the UL DMRS does not exist in both of the first slot and the second slot, determining that the UL signal is not transmitted in the UL subframe.

15. The method of claim 11, wherein a correspondence between a candidate transmission position and a UL DMRS transmission position is predefined, and
- determining the starting transmission position for the UL signal in the UL subframe specifically comprises:
- determining a transmission position of a UL DMRS by blind detection;
- searching the predefined correspondence between the candidate transmission position and the UL DMRS transmission position for a candidate transmission position corresponding to the determined transmission position of the UL DMRS; and
- determining the found candidate transmission position as the starting transmission position for the UL signal.

16. A communication device, comprising: a processor and a memory configured to store a computer program capable of running on the processor,
- wherein the processor is configured to run the computer program to execute operations comprising:
- determining a starting transmission position for transmission of the UL signal from at least one predefined candidate transmission position according to a Listen Before Talk (LBT) result; and
- starting a transmission of the UL signal at the determined starting transmission position,
- wherein, during determining the starting transmission position for transmission of the UL signal from the at least one predefined candidate transmission position according to the LBT result, the processor is specifically configured to:
- for a UL subframe, sequentially sense, whether a channel is idle before each candidate transmission position in the UL subframe from a first candidate transmission position of the UL subframe, until sensing a candidate transmission position when the channel is idle before the candidate trasmission position; and
- determine the candidate transmission position when the channel is idle before the candidate trasmission position as the starting transmission position for transmission of the UL signal; and
- wherein, for each candidate transmission position, during determining whether the channel is idle before the candidate transmission position, the processor is specifically configured to:
- start detection of at least one of a total power level or a predetermined characteristic signal level on the present channel at a predetermined advance prior to the candidate transmission position;
- when the total power level is less than a first predetermined threshold and/or the predetermined characteristic signal level is less than a second predetermined threshold within a predefined duration, determine that the channel is idle before the candidate transmission position; or
- when the total power level is not less than the first predetermined threshold and the predetermined characteristic signal level is not less than the second predetermined threshold within the predefined duration, determine that the channel is busy before the candidate transmission position; or,
- the processor is configured to run the computer program to execute operations comprising:
- sending a UL grant message to schedule User Equipment (UE) for UL transmission;
- receiving a UL subframe sent by the UE; and
- determining a starting transmission position for a UL signal in the UL subframe,
- wherein determining the starting transmission position for the UL signal in the UL subframe specifically comprises:
- attempting to perform data demodulation at each candidate transmission position configured for the UE in the UL subframe; and
- determining the candidate transmission position where a Cyclic Redundancy Check (CRC) check succeeds after demodulation as the starting transmission position for UL signal transmission of the UE.

* * * * *